US010395404B2

(12) United States Patent
Nishiyama et al.

(10) Patent No.: US 10,395,404 B2
(45) Date of Patent: Aug. 27, 2019

(54) IMAGE PROCESSING DEVICE FOR COMPOSITE IMAGES, IMAGE PROCESSING SYSTEM AND STORAGE MEDIUM

(71) Applicant: KABUSHIKI KAISHA TOSHIBA, Minato-ku, Tokyo (JP)

(72) Inventors: Masashi Nishiyama, Kanagawa (JP); Masahiro Sekine, Tokyo (JP); Kaoru Sugita, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/826,331

(22) Filed: Aug. 14, 2015

(65) Prior Publication Data

US 2016/0071321 A1 Mar. 10, 2016

(30) Foreign Application Priority Data

Sep. 4, 2014 (JP) ................................ 2014-180291

(51) Int. Cl.
*G06T 11/60* (2006.01)
*G06T 19/00* (2011.01)

(52) U.S. Cl.
CPC .............. *G06T 11/60* (2013.01); *G06T 19/00* (2013.01); *G06T 2210/16* (2013.01)

(58) Field of Classification Search
CPC ....... G06T 11/60; G06T 19/00; G06T 19/006; G06T 2210/16; G06C 30/0643
USPC .......................................................... 345/640
See application file for complete search history.

(56) References Cited

U.S. PATENT DOCUMENTS

| | | | | |
|---|---|---|---|---|
| 7,308,332 | B2 | 12/2007 | Okada et al. | |
| 7,409,259 | B2 | 8/2008 | Moreno | |
| 7,433,753 | B2 | 10/2008 | Okada et al. | |
| 8,674,989 | B1 | 3/2014 | Dalal et al. | |
| 2005/0154487 | A1 * | 7/2005 | Wang .................... | A41H 3/007 700/132 |
| 2006/0015208 | A1 | 1/2006 | Moreno | |

(Continued)

FOREIGN PATENT DOCUMENTS

| | | |
|---|---|---|
| JP | 2003-263632 | 9/2003 |
| JP | 2004-246729 | 9/2004 |

(Continued)

OTHER PUBLICATIONS

English-language machine translation of JP2004-246729.
English-language machine translation of JP2004-272530.

*Primary Examiner* — Jeffery A Brier
(74) *Attorney, Agent, or Firm* — Nixon & Vanderhye, P.C.

(57) ABSTRACT

According to one embodiment, an image processing device includes a subject image acquisition module, a first clothing image acquisition module and a second clothing image generator. The subject image acquisition module is configured to acquire subject images which are images of a subject successively picked up by an image pickup module. The first clothing image acquisition module is configured to acquire a first clothing image which is an image of clothes worn by the subject included in the subject images. The second clothing image generator is configured to adjust transparency of a pixel at a predetermined place of pixels constituting the first clothing image, and generate a second clothing image different from the first clothing image.

20 Claims, 13 Drawing Sheets

(56) References Cited

U.S. PATENT DOCUMENTS

| | | | | | |
|---|---|---|---|---|---|
| 2006/0202986 | A1 | 9/2006 | Okada et al. | | |
| 2007/0233311 | A1 | 10/2007 | Okada et al. | | |
| 2007/0273711 | A1 | 11/2007 | Maffei | | |
| 2011/0096183 | A1* | 4/2011 | Robertson | H04N 5/275 | 348/222.1 |
| 2011/0298897 | A1* | 12/2011 | Sareen | G06N 3/006 | 348/47 |
| 2013/0113789 | A1* | 5/2013 | Suzuki | G06T 19/006 | 345/419 |
| 2013/0113828 | A1 | 5/2013 | Miyazaki | | |
| 2013/0113829 | A1* | 5/2013 | Suzuki | G09G 5/00 | 345/633 |
| 2013/0113830 | A1* | 5/2013 | Suzuki | G06T 3/00 | 345/634 |
| 2014/0035913 | A1* | 2/2014 | Higgins | G06T 17/00 | 345/420 |
| 2014/0085330 | A1 | 3/2014 | Sugita et al. | | |
| 2014/0118396 | A1 | 5/2014 | Sugita et al. | | |
| 2014/0180873 | A1* | 6/2014 | Rijhwani | G06Q 30/0643 | 705/26.61 |
| 2014/0201023 | A1* | 7/2014 | Tang | G06Q 30/0643 | 705/26.5 |
| 2015/0154691 | A1* | 6/2015 | Curry | G06Q 30/0643 | 705/27.2 |
| 2015/0269291 | A1 | 9/2015 | Sekine et al. | | |

FOREIGN PATENT DOCUMENTS

| | | |
|---|---|---|
| JP | 2004-272530 | 9/2004 |
| JP | 2006-512486 | 4/2006 |
| JP | 4189339 | 9/2008 |
| JP | 4473754 | 3/2010 |
| JP | 2013-101468 | 5/2013 |
| JP | 2014-71501 | 4/2014 |
| JP | 2014-89665 | 5/2015 |
| JP | 2015-184875 | 10/2015 |
| WO | WO-2012/110828 A1 * | 8/2012 |

* cited by examiner

14a

| Subject ID | Subject information | | | Clothing ID | Clothing image (second clothing image and third clothing image) | Attribute information |
|---|---|---|---|---|---|---|
| | Subject image | Body shape parameter | Reference position information | | | |
| A | First subject image | First body shape parameter | | | Second clothing image | |
| | | | | | Second clothing image | |
| | | | | | Second clothing image | |
| | | | | | Second clothing image | |
| | | | | | Second clothing image | |
| | Second subject image | Second body shape parameter | | | Third clothing image | |
| | | | | | Third clothing image | |
| | | | | | Third clothing image | |
| | | | | | Third clothing image | |
| | | | | | Third clothing image | |
| | ... | ... | ... | ... | ... | ... |
| | ... | ... | ... | ... | ... | ... |
| | ... | ... | ... | ... | ... | ... |
| | ... | ... | ... | ... | ... | ... |
| B | ... | ... | ... | ... | ... | ... |
| ... | ... | ... | ... | ... | ... | ... |
| ... | ... | ... | ... | ... | ... | ... |

FIG. 2

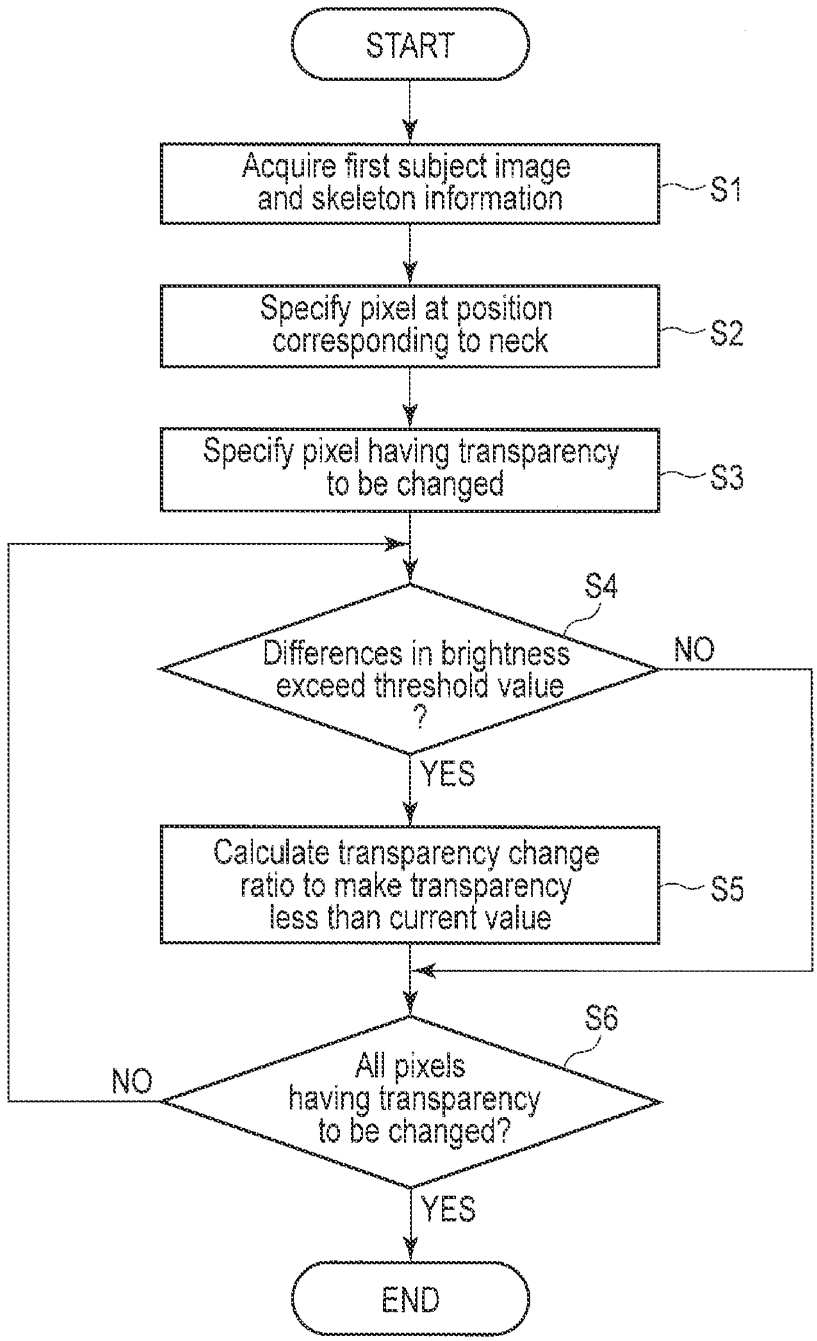
F I G. 6

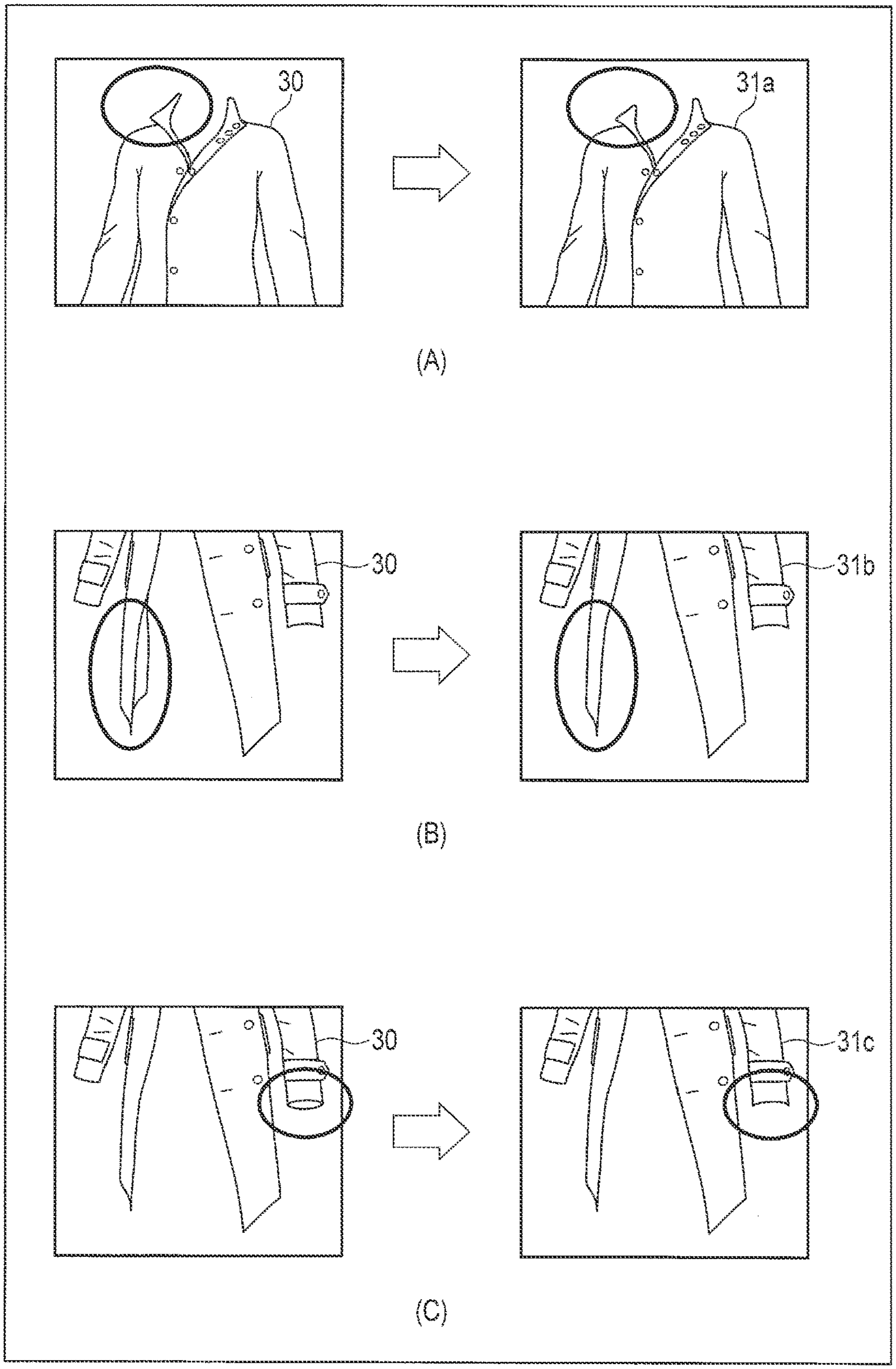
F I G. 7

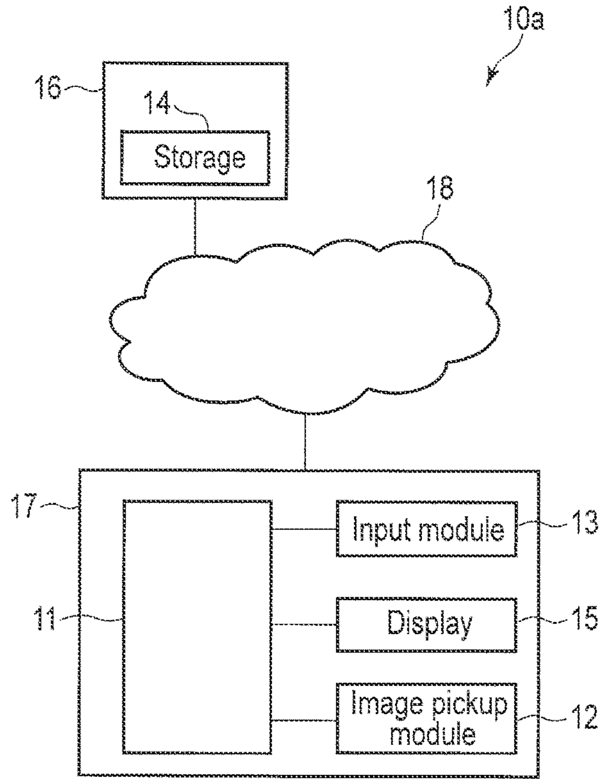
F I G. 14
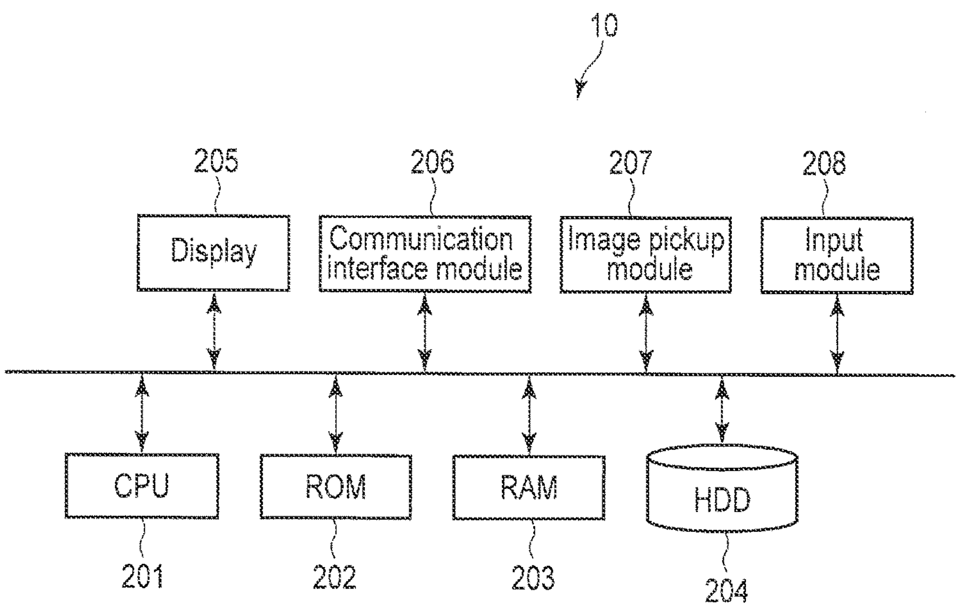
F I G. 15

IMAGE PROCESSING DEVICE FOR COMPOSITE IMAGES, IMAGE PROCESSING SYSTEM AND STORAGE MEDIUM

CROSS-REFERENCE TO RELATED APPLICATIONS

This application is based upon and claims the benefit of priority from Japanese Patent Application No. 2014-180291, filed Sep. 4, 2014, the entire contents of which are incorporated herein by reference.

FIELD

Embodiments described herein relate generally to an image processing device, an image processing system and a storage medium.

BACKGROUND

In recent years, technology which, for example, enables a user to virtually try on clothes for a fitting (hereinafter referred to as a virtual fitting) has been developed.

According to the technology, because a composite image in which an image of clothes is superimposed on an image including the user (subject) picked up by an image pickup module can be displayed on, for example, a display provided at a position facing the user, the user can select clothes to the user's liking without actually trying them on.

However, in the conventional art, because an image of clothes picked up in advance has been superimposed on an image including a user as it is, there has been inconvenience that it is hard to present a natural fitting state to the user.

BRIEF DESCRIPTION OF THE DRAWINGS

FIG. 2 illustrates a data structure of a clothing DB according to the embodiment.

FIG. 6 is a flowchart showing an example of a procedure of processes performed by a first edit value calculator according to the embodiment.

FIG. 7 is an illustration for explaining a difference between before and after changing transparency in the embodiment.

FIG. 14 illustrates another structure example of the image processing system according to the embodiment.

FIG. 15 is a block diagram showing an example of a hardware structure of the image processing device according to the embodiment.

DETAILED DESCRIPTION

In general, according to one embodiment, an image processing device includes a subject image acquisition module, a first clothing image acquisition module and a second clothing image generator. The subject image acquisition module is configured to acquire subject images which are images of a subject successively picked up by an image pickup module. The first clothing image acquisition module is configured to acquire a first clothing image which is an image of clothes worn by the subject included in the subject images. The second clothing image generator is configured to adjust transparency of a pixel at a predetermined place of pixels constituting the first clothing image, and generate a second clothing image different from the first clothing image.

Figure 1:
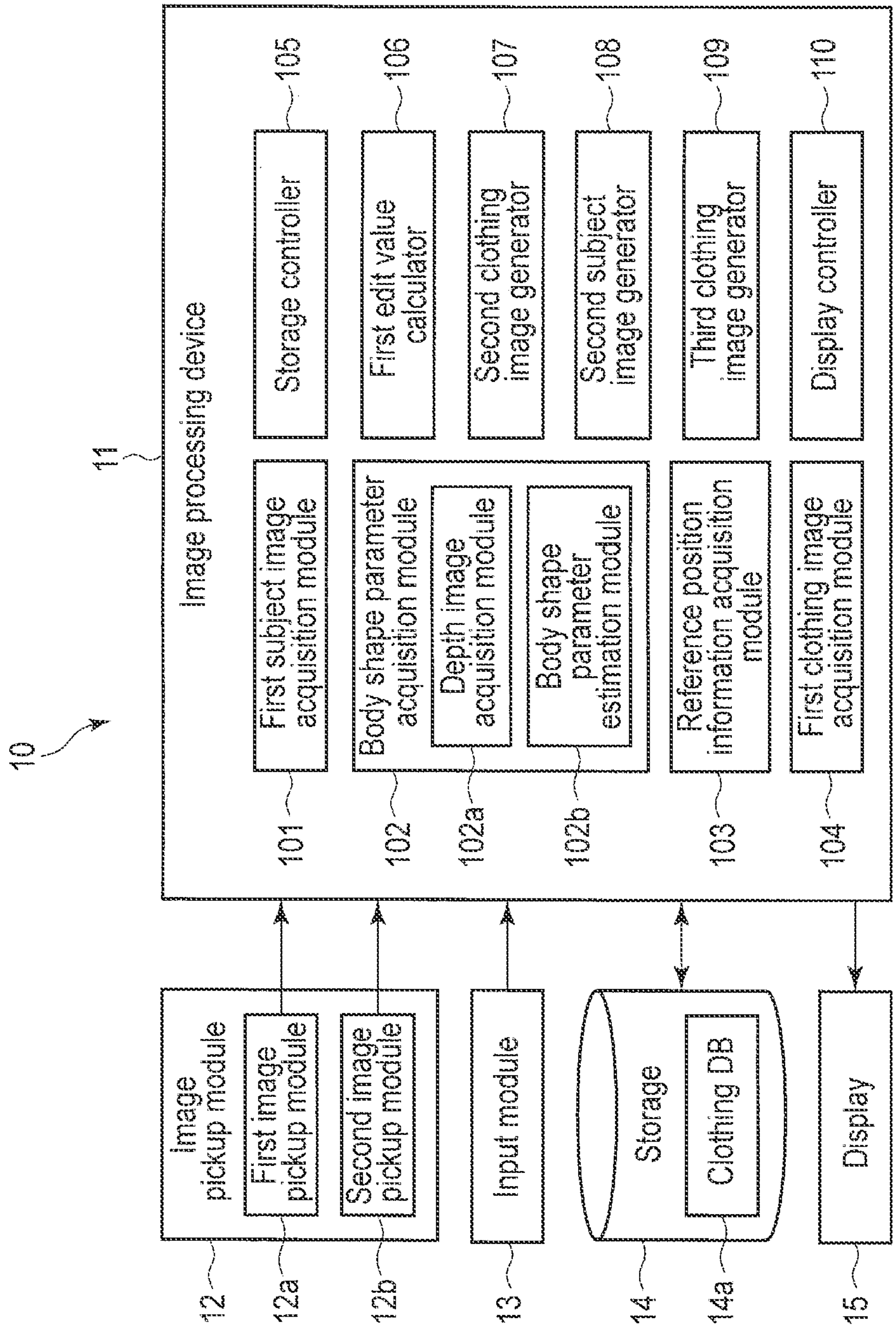
FIG. 1 is a block diagram showing a functional structure of an image processing system according to one embodiment.

FIG. 1 is a block diagram showing a functional structure of an image processing system according to one embodiment. An image processing system 10 shown in FIG. 1 includes an image processing device 11, an image pickup module 12, an input module 13, a storage 14, and a display 15. The image processing device 11, the image pickup module 12, the input module 13, the storage 14, and the display 15 are connected to be allowed to communicate with each other.

In the embodiment, it is assumed that the image processing system 10 has a structure in which the image processing device 11, the image pickup module 12, the input module 13, the storage 14, and the display 15 are provided separately from each other. However, for example, the image processing device 11 and at least one of the image pickup module 12, the input module 13, the storage 14, and the display 15 may be integrally provided. Moreover, in the embodiment, although it is assumed that the image processing system 10 is provided with the display 15, the image processing system 10 may not be provided with the display 15.

The image pickup module 12 picks up an image of a first subject, and acquires a first subject image of the first subject. The acquired first subject image is output to the image processing device 11.

Here, the first subject is an object which tries on clothes. In addition, the first subject may be any object as long as it tries on clothes, and may be animate or inanimate. Although the first subject includes, for example, a person, if it is animate, the first subject is not limited to a person. The first subject may be, for example, an animal (pet) such as a dog or a cat. Moreover, although the first subject includes, for example, a mannequin imitating the shape of a human body or an animal, other objects, etc., if it is inanimate, the first subject may be other than these.

The clothes are items (goods) which a subject can wear. The clothes are, for example, a coat, a skirt, pants, shoes, and a hat. In addition, the clothes are not limited to the coat, the skirt, the pants, the shoes, and the hat described herein.

The image pickup module 12 includes a first image pickup module 12*a* and a second image pickup module 12*b*.

The first image pickup module 12*a* successively picks up images of a first subject at predetermined intervals, and sequentially acquires color images including the first subject whose images have been picked up. The color images are bitmap images, and are images for which a pixel value indicating the color, the brightness, etc., of the first subject is determined for each pixel. As the first image pickup module 12*a*, a well-known image pickup device (camera) which can acquire a color image is used.

The second image pickup module 12*b* successively picks up images of a first subject at predetermined intervals, and sequentially acquires depth images (depth maps) including the first subject whose images have been picked up. The depth images are images for which a distance from the second image pickup module 12*b* is determined for each pixel. As the second image pickup module 12*b*, a well-known image pickup device (depth sensor) which can acquire a depth image is used. In addition, in the embodiment, it has been assumed that a depth image is acquired by picking up an image of a subject with the second image pickup module 12*b*. However, for example, the depth image may be generated from a color image of the first subject using a well-known method such as stereo matching.

In addition, in the embodiment, the first image pickup module 12*a* and the second image pickup module 12*b* pick up images of a first subject with the same timing. That is, the first image pickup module 12*a* and the second image pickup module 12*b* are controlled by a controller, etc., not shown in the figures, to sequentially pick up images synchronously with the same timing. The first image pickup module 12*a* and the second image pickup module 12*b* thereby acquire (a pair of) a color image and a depth image of the first subject which have been picked up (acquired) with the same timing. The color image and depth image of the first subject which have been picked up with the same timing in this manner are output to the image processing device 11 as described above. In addition, in the embodiment, the description will be given on the assumption that camera coordinate systems of the first image pickup module 12*a* and the second image pickup module 12*b* are the same. If the camera coordinate systems of the first image pickup module 12*a* and the second image pickup module 12*b* are different, it suffices that the image processing device 11 converts the camera coordinate system of one of the image pickup modules into the camera coordinate system of the other of the image pickup modules, and uses it for various processes.

Moreover, although it has been assumed that a first subject image includes a color image and a depth image, the first subject image may further include, for example, skeleton information which will be described later.

The input module 13 is an input interface which can receive input from a user. As the input module 13, for example, a combination of one or more of a mouse, a button, a remote controller, a voice recognition device (for example, a microphone), and an image recognition device is used. For example, if an image recognition device is used as the input module 13, it may be a device which receives gestures, etc., of the user facing the input module 13 as various instructions (input) of the user. In this case, the user's operation instruction may be received by storing instruction information corresponding to various movements such as gestures in a memory, etc., of the image recognition device (input module), and reading instruction information corresponding to a recognized gesture from the memory.

Moreover, the input module 13 may be a communication device which can receive a signal indicating the user's operation instruction from an external device, such as a mobile terminal, which can transmit various kinds of information. In this case, it suffices that upon receiving input of a signal indicating an operation instruction from the above-described external device, the input module 13 receives an operation instruction indicated by the received signal as an operation instruction from the user.

In addition, the input module 13 may be integrally provided with the display 15. Specifically, the input module 13 and the display 15 may be a user interface (UI) module equipped with both an input function and a display function. The UI module is, for example, a liquid crystal display (LCD) with a touchpanel.

The storage 14 stores various kinds of data. Here, in the storage 14, a clothing database (hereinafter, referred to as clothing DB) 14*a* is stored. The clothing DB 14*a* will be described hereinafter with reference to FIG. 2.

FIG. 2 illustrates an example of a data structure of the clothing DB 14*a*. The clothing DB 14*a* is a database storing clothing images of clothes to be combined with the user using a virtual fitting. Specifically, subject information, clothing IDs, clothing images, and attribute information are included, being associated with each other.

The subject information includes subject IDs, subject images, body shape parameters, and reference position information, associating them with each other. The subject IDs are identification information for uniquely identifying each subject. The subject images include a first subject image, and a second subject image which will be described later. The first subject image is a first subject image of a first subject acquired by the image pickup module 12. The second subject image is a subject image generated by editing the first subject image by the image processing device 11.

The body shape parameters are information indicating a body shape of a subject. The body shape parameters include one or more parameters. Here, the parameters are measured values of one or more places of a human body. In addition, the measured values are not limited to actually measured values, and include values obtained by estimating the measured values, and values corresponding to the measured values (values arbitrarily input by the user, etc.).

In the embodiment, the parameters are measured values corresponding to respective parts of a human body measured when clothes are tailored or purchased, etc. Specifically, the body shape parameters include at least one parameter of a chest measurement, a trunk measurement, a waist measurement, a height, and a shoulder width. In addition, parameters included in the body shape parameters are not limited to these parameters. For example, the body shape parameters may further include parameters such as the length of a sleeve, an inside leg measurement, an apex position of a three-dimensional CG model, and a joint position of a frame.

The body shape parameters include a first body shape parameter and a second body shape parameter. The first body shape parameter is a parameter indicating a body shape of a first subject. The second body shape parameter is a parameter indicating a body shape of a subject (second subject) photographing in a second subject image.

The reference position information is information used as a reference of positioning at the time of composition, and includes, for example, a feature region, an outline, feature points, etc. The time of composition is a time when a subject image of a subject and a clothing image are combined.

The feature region is a region where the shape of a subject can be estimated in a subject image. The feature region is a shoulder region corresponding to the shoulders of a human body, a waist region corresponding to the waist of a human body, a foot region corresponding to the feet of a human body, or the like. In addition, the feature region is not limited to the above-described regions.

The outline is an outline of a region where the shape of a subject can be estimated in a subject image. For example, if the region where the shape of the subject can be estimated is a shoulder region of the human body, the outline in the subject image is a linear image indicating an outline of the shoulder region.

The feature points are points where the shape of a subject can be estimated in a subject image, and are, for example, respective positions (respective points) indicating joint parts of the human body, a position (point) corresponding to the center of the above-described feature region, and a position (point) corresponding to the center of the shoulders of the human body. In addition, the feature points are indicated by position coordinates on an image. Moreover, the feature points are not limited to the above-described positions (points).

Figure 3:
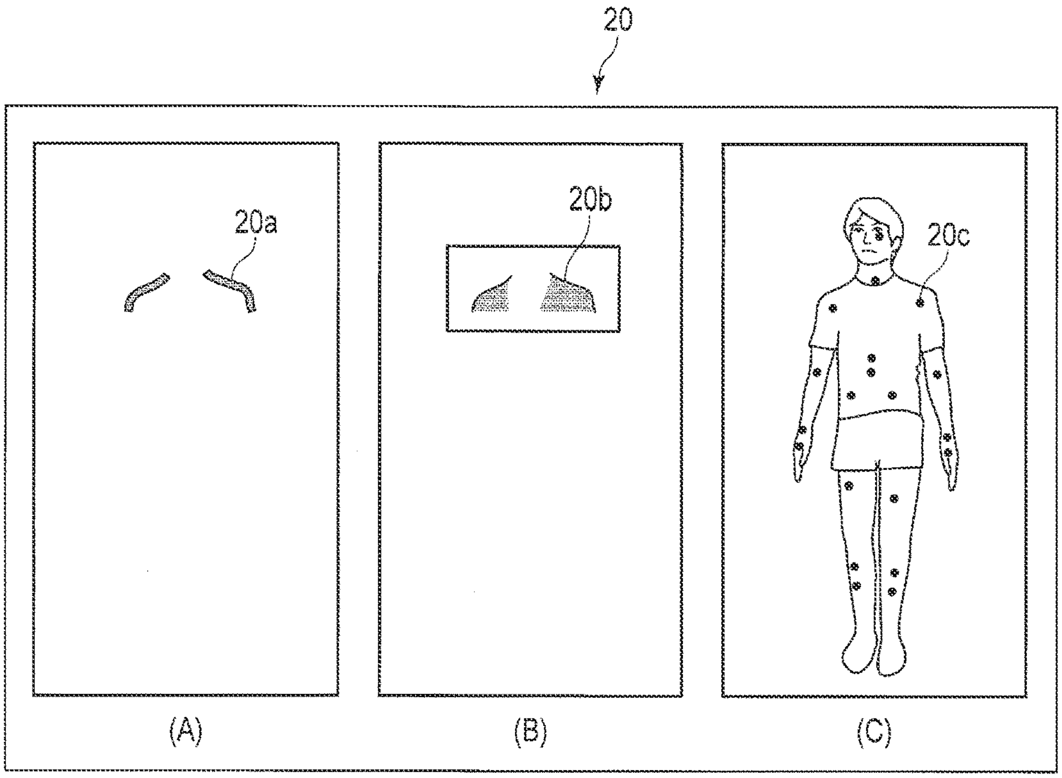
FIG. 3 illustrates an example of reference position information according to the embodiment.

FIG. 3 illustrates an example of reference position information 20. FIG. 3(A) illustrates an example of the outline, and shows an outline 20*a* of the shoulders of the human body. In addition, FIG. 3(B) illustrates an example of the feature region, and shows a region 20*b* of the shoulders of the human body as a feature region. Moreover, FIG. 3(C) illustrates an example of the feature points, and shows respective points corresponding to the joint parts of the human body as feature points 20*c*. In addition, the reference position information is any information as long as it indicates a reference of positioning at the time of generating a composite image, and is not limited to the above-described feature region, outline, and feature points.

Returning to the description relating to FIG. 2, the clothing DB 14*a* stores one reference position information item, associating it with one subject image and one body shape parameter. In other words, the clothing DB 14*a* stores one reference position information item, associating it with one body shape parameter.

The clothing IDs are identification information for uniquely identifying clothes. The clothes specifically mean ready-made clothes. The clothing IDs include, for example, the product number of clothes and the name of clothes, but are not limited to these. As the product number, for example, a JAN code can be used. As the name, for example, an item name of clothes can be used.

The clothing images are images of clothes. The clothing images are images for which a pixel value indicating the color, brightness, etc., of clothes is determined for each pixel. The clothing images include a second clothing image and a third clothing image. The second clothing image is a clothing image generated by editing a first clothing image (that is, an unprocessed clothing image cut out from a first subject image) by the image processing device 11. The third clothing image is a clothing image generated by editing the second clothing image by the image processing device 11.

The attribute information is information indicating an attribute of clothes identified by an associated clothing ID. The attribute information is, for example, the kind of clothes, the size of clothes, the name of clothes, the selling agency (brand name, etc.) of clothes, the shape of clothes, the color of clothes, the material for clothes, and the price of clothes. In addition, the attribute information may further include a subject ID for identifying a first subject photographing in an associated first subject image, a first edit value used when a second clothing image is generated from the first clothing image, a second edit value used when a third clothing image is generated from the second clothing image, etc.

The clothing DB 14*a* stores a plurality of clothing images (one or more second clothing images and one or more third clothing images), associating them with one subject image, one body shape parameter, and one reference position information item. In addition, it suffices that the clothing DB 14*a* stores information in which one subject image, one body shape parameter, one reference position information item, and a plurality of clothing images are associated. That is, the clothing DB 14*a* may not include at least one of the subject IDs, the clothing IDs, and the attribute information. Moreover, the clothing DB 14*a* may store information further associated with information other than the above-described various kinds of information.

Returning to the description relating to FIG. 1, the image processing device 11 is a computer including a central processing unit (CPU), a read-only memory (ROM), a random access memory (RAM), etc. In addition, the image processing device 11 may further include a circuit, etc., other than those described above.

The image processing device includes a first subject image acquisition module 101, a body shape parameter acquisition module 102, a reference position information acquisition module 103, a first clothing image acquisition module 104, a storage controller 105, a first edit value calculator 106, a second clothing image generator 107, a second subject image generator 108, a third clothing image generator 109, and a display controller 110.

Some or all of the first subject image acquisition module 101, the body shape parameter acquisition module 102, the reference position information acquisition module 103, the first clothing image acquisition module 104, the storage controller 105, the first edit value calculator 106, the second clothing image generator 107, the second subject image generator 108, the third clothing image generator 109, and the display controller 110 may be implemented, for example, by causing a processing unit such as a CPU to execute a program, that is, as software, may be implemented as hardware such as an integrated circuit (IC), or may be implemented by using software and hardware together.

The first subject image acquisition module 101 acquires a first subject image of a first subject from the image pickup module 12. In addition, the first subject image acquisition module 101 may acquire a first subject image from an external device not shown in the figures through a network, etc. Moreover, the first subject image acquisition module 101 may acquire a first subject image by reading the first subject image stored in advance in the storage 14, etc. In the embodiment, the description will be given on the assumption that the first subject image acquisition module 101 acquires a first subject image from the image pickup module 12.

In addition, it is preferable that when an image of a first subject is picked up, the first subject be in the state of wearing clothes which clarify the lines of a body (for example, underclothes). The accuracy of an estimation process of a first body shape parameter and a calculation process of reference position information which will be described later can be thereby improved. Thus, a process of generating a second clothing image which will be described later can be performed after accurately calculating a first body shape parameter and reference position information, by first picking up a first subject image in the state of wearing the clothes which clarify the lines of the body, and then picking up a first subject image in the state of wearing normal clothes (to be combined).

The body shape parameter acquisition module 102 acquires a first body shape parameter indicating a body shape of a first subject. The body shape parameter acquisition module 102 includes a depth image acquisition module 102*a* and a body shape parameter estimation module 102*b*.

The depth image acquisition module 102*a* acquires a depth image (depth map) included in a first subject image acquired by the first subject image acquisition module 101. In addition, the depth image included in the first subject image may include a background region, etc., other than a person region. Therefore, the depth image acquisition module 102*a* acquires a depth image of a first subject by extracting the person region in the depth image acquired from the first subject image.

The depth image acquisition module 102*a*, for example, extracts a person region by setting a threshold value for a distance in a depth direction of a three-dimensional position of each of the pixels constituting a depth image. For example, it is assumed that in a camera coordinate system of the second image pickup module 12*b*, a position of the second image pickup module 12*b* is the origin, and the positive direction of the z-axis is the optical axis of a camera extending in a subject direction from the origin of the second image pickup module 12*b*. In this case, of the pixels constituting the depth image, a pixel whose position coordinate in the depth direction (z-axial direction) is greater than or equal to a predetermined threshold value (for example, a value indicating 2 m) is excluded. The depth image acquisition module 102*a* can thereby acquire a depth image including pixels of a person region existing in a range of the threshold value, that is, a depth image of a first subject, from the second image pickup module 12*b*.

The body shape parameter estimation module 102*b* estimates a first body shape parameter of the first subject from the depth image of the first subject acquired by the depth image acquisition module 102*a*. Specifically, the body shape parameter estimation module 102*b* first applies three-dimensional model information of a human body to the depth image of the first subject. Then, the body shape parameter estimation module 102*b* calculates a value of each parameter included in the first body shape parameter (for example, each value of a chest measurement, a trunk measurement, a waist measurement, a height, a shoulder width, etc.) using the three-dimensional model information applied to the first subject and the depth image.

More specifically, the body shape parameter estimation module 102*b* first applies the three-dimensional model information (three-dimensional polygon model) of the human body to the depth image of the first subject. Then, the body shape parameter estimation module 102*b* estimates the above-described measured values from the distances of regions corresponding to parameters (a chest measurement, a trunk measurement, a waist measurement, a height, a shoulder width, etc.) in the three-dimensional model information of the human body applied to the depth image of the first subject. Specifically, the body shape parameter estimation module 102*b* calculates (estimates) a value of each parameter of the chest measurement, the trunk measurement, the waist measurement, the height, the shoulder width, etc., from a distance between two apexes, the length of a ridge line connecting two apexes, etc., in the applied three-dimensional model information of the human body. The two apexes represent one end and the other end of a region corresponding to each parameter (the chest measurement, the trunk measurement, the waist measurement, the height, the shoulder width, etc.) to be calculated in the applied three-dimensional model information of the human body. In addition, a value of each parameter included in a second body shape parameter of a second subject which will be described later can also be calculated in the same manner.

In addition, in the embodiment, although it has been assumed that the body shape parameter acquisition module 102 acquires a first body shape parameter estimated by the body shape parameter estimation module 102*b*, the body shape parameter acquisition module 102 may acquire, for example, a first body shape parameter input by the user's operation instruction of the input module 13. In this case, it is necessary to cause the display controller 110, which will be described later, to display an input screen of a first body shape parameter on the display 15, and prompt the user to perform input on the input screen. The input screen includes, for example, blanks for inputting a chest measurement, a trunk measurement, a waist measurement, a height, a shoulder width, etc., and the user can input a value in a blank for each parameter by operating the input module 13 while referring to the input screen displayed on the display 15. The body shape parameter acquisition module 102 may acquire a first body shape parameter in this manner.

The reference position information acquisition module 103 acquires reference position information indicating a position of a region to be referred to reference region. Here, the case where the reference position information acquisition module 103 acquires a feature region, an outline, and feature points as reference position information will be described.

The reference position information acquisition module 103 first acquires a color image of a first subject included in a first subject image acquired by the first subject image acquisition module 101. Then, the reference position information acquisition module 103 extracts, for example, a region corresponding to the shoulders of a human body (shoulder region) in the acquired color image as a feature region. Moreover, the reference position information acquisition module 103 extracts an outline of the extracted shoulder region. In addition, the outline is a linear image along an outer shape of the human body, and the above-described outline of the shoulder region is a linear image along an outer shape of the shoulder region of the human body.

In addition, a feature region and an outline of any region of respective parts of the human body (which is not limited to the above-described shoulders, and is, for example, the waist) may be acquired. Moreover, identification information indicating a region of a feature region and an outline to be acquired may be stored in advance in the storage 14. In this case, the reference position information acquisition module 103 acquires a region identified by the above-described identification information stored in the storage 14 as a feature region and an outline extracted from the feature region. In addition, it suffices that the reference position information acquisition module 103 distinguishes regions corresponding to the respective regions of the human body in a first subject image using a well-known method.

The feature points are calculated from, for example, skeleton information of a first subject. The skeleton information is information indicating a frame of a subject. In this case, the reference position information acquisition module 103 first acquires a depth image of the first subject acquired by the depth image acquisition module 102*a*. Then, the reference position information acquisition module 103 generates skeleton information by applying a human body shape to each of the pixels constituting the depth image of the first subject. Further, the reference position information acquisition module 103 acquires positions of respective joints indicated by the generated skeleton information as feature points.

In addition, the reference position information acquisition module 103 may acquire a position corresponding to the center of an acquired feature region as a feature point. In this case, it suffices that the reference position information acquisition module 103 reads the position corresponding to the center of the feature region from skeleton information, and acquires it as a feature point. For example, if the center of the above-described shoulder region is acquired as a feature point, the center of the shoulder region can be acquired as a feature point by determining a central position between the shoulders from skeleton information. Moreover, although it has been herein assumed that skeleton information is generated from a depth image included in a first subject image, the skeleton information may be included in the first subject image in advance.

Figure 4:
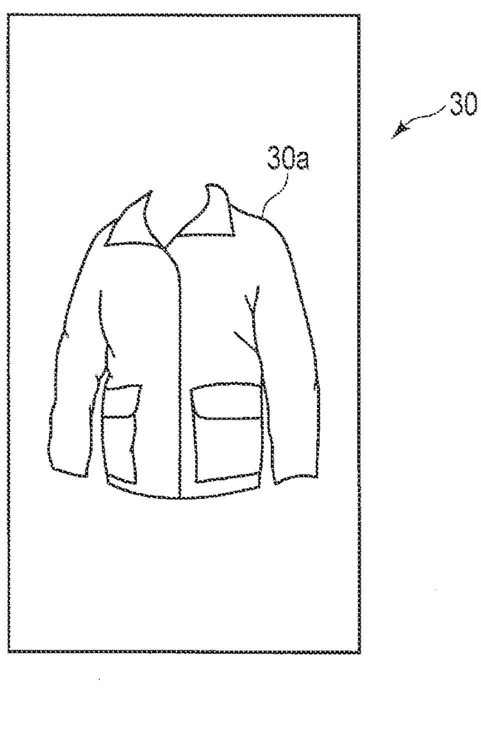
FIG. 4 illustrates an example of a first clothing image according to the embodiment.

The first clothing image acquisition module 104 acquires a first clothing image 30*a* as shown in FIG. 4 by extracting a clothing region from a first subject image acquired from the image pickup module 12. In addition, the first clothing image acquisition module 104 may acquire a first clothing image from an external device not shown in the figures through a network, etc.

The storage controller 105 stores various kinds of data in the storage 14. Specifically, the storage controller 105 stores a first subject image acquired by the first subject image acquisition module 101 in the clothing DB 14*a*, associating it with a subject ID of a first subject. Moreover, the storage controller 105 stores reference position information acquired by the reference position information acquisition module 103 in the clothing DB 14*a*, associating it with the first subject image. Furthermore, the storage controller 105 stores a first body shape parameter acquired by the body shape parameter acquisition module 102 in the clothing DB 14*a*, associating it with the first subject image. Thus, the first subject image, the first body shape parameter, and the reference position information are stored in the clothing DB 14*a*, being associated one-to-one as shown in FIG. 2.

The first edit value calculator 106 calculates a first edit value. More specifically, the first edit value calculator 106 calculates a first image value for editing a first clothing image so that a first subject in a first subject image will be in the state of naturally wearing clothes of the first clothing image.

Figure 5:
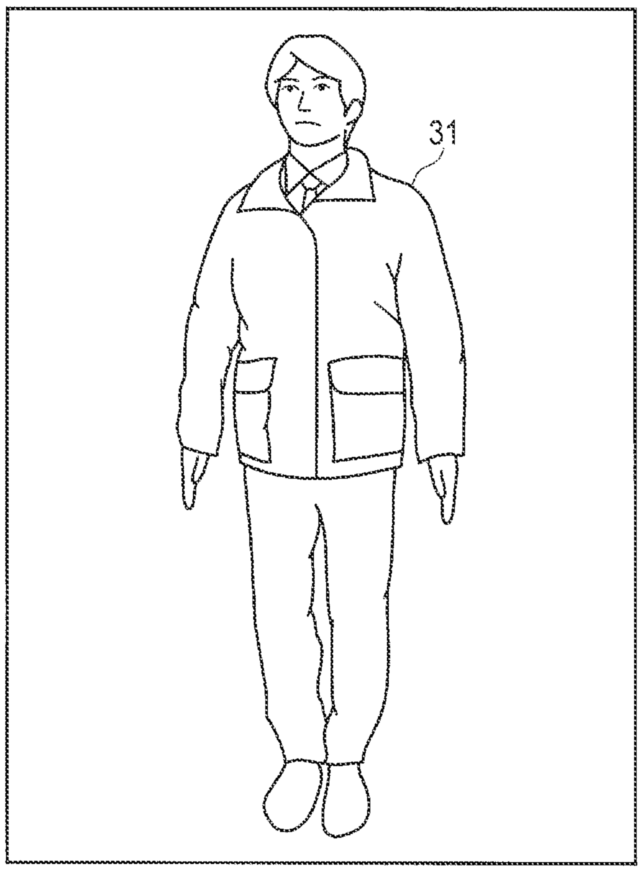
FIG. 5 is an illustration for explaining a second clothing image according to the embodiment.

FIG. 5 is an illustration for explaining a second clothing image. As shown in FIG. 5, the first edit value calculator 106 calculates a first edit value for editing the first clothing image 30*a* to generate a second clothing image 31 which makes the first subject natural when it wears the clothes of the first clothing image 30*a* shown in FIG. 4. The first edit value includes at least one of a transparency change ratio, a scaling ratio, a deformation ratio, and a range of change of a position. The transparency change ratio is used for editing transparency. The scaling ratio is used for editing a size. The deformation ratio is used for editing a shape. The range of change of a position is used for editing a position. That is, the first edit value calculator 106 calculates at least one of the transparency change ratio, the scaling ratio, the deformation ratio, and the range of change of a position as a first edit value.

In the following description, the case of calculating a transparency change ratio for changing transparency (transparency or an alpha value) of pixels located around a neck, a sleeve, and a skirt of a first clothing image as a first edit value will be first described with reference to the flowchart of FIG. 6. Here, the case of calculating a transparency change ratio for changing transparency around the neck (collar) of clothes as a first edit value will be mainly described. In addition, the transparency is a value between 0 and 1.

First, the first edit value calculator 106 acquires a first subject image acquired by the first subject image acquisition module 101 and skeleton information generated by the reference position information acquisition module 103 (or skeleton information included in the first subject image) (step S1).

Then, the first edit value calculator 106 specifies a pixel at a position corresponding to the neck (in other words, a pixel located at a feature point of the neck) of joint positions on the acquired first subject image from the acquired skeleton information (step S2). Next, the first edit value calculator 106 specifies one or more pixels located to be distant by a predetermined number of pixels from the specified pixel at the position corresponding to the neck. Then, the first edit value calculator 106 specifies a pixel (hereinafter, referred to as a pixel having transparency to be changed) constituting a clothing part (included in a clothing region) of the first subject image of the specified one or more pixels (step S3).

If a plurality of pixels having transparency to be changed are specified in the above-described process of step S3, the following process is performed for each of the specified pixels having transparency to be changed.

Next, the first edit value calculator 106 determines whether differences in brightness between a specified pixel having transparency to be changed and one or more pixels located around the pixel having transparency to be changed each exceed a predetermined threshold value (step S4).

If none of the differences in brightness between the pixels exceeds the predetermined threshold value as a result of the above-described determination in step S4 (NO in step S4), the first edit value calculator 106 determines that the transparency of the pixel having transparency to be changed need not be changed, and the flow proceeds to the process of step S6 which will be described later.

On the other hand, if any of the differences in brightness between the pixels exceeds the predetermined threshold value as a result of the above-described determination in step S4 (YES in step S4), the first edit value calculator 106 calculates (sets) a transparency change ratio which makes the transparency of the pixel having transparency to be changed less than the current transparency as a first edit value (step S5).

Then, the first edit value calculator 106 determines whether the above-described process of step S4 has been performed for all the pixels having transparency to be changed (step S6). If the above-described process of step S4 has not been performed for all the pixels having transparency to be changed as a result of the determination in step S6 (NO in step S6), the first edit value calculator 106 performs the above-described process in step S4 for the next pixel having transparency to be changed.

On the other hand, if the above-described process in step S4 has been performed for all the pixels having transparency to be changed as a result of the above-described determination in step S6 (YES in step S6), the processes herein end.

In this manner, a transparency change ratio is determined by comprehensively considering a distance from a pixel at a position corresponding to the neck and differences in brightness between a pixel located at the distance and pixels located around the pixel.

In addition, although the case where only the distance from the pixel at the position corresponding to the neck is considered to specify a pixel having transparency to be changed which is located around the neck has been herein described, not only the distance from the neck but a distance from the shoulders, the face, or the like, for example, may be considered to specify a pixel having transparency to be changed (that is, not only the neck but the shoulders or the face may be weighted to specify a pixel having transparency to be changed). Specifically, the first edit value calculator 106 may specify a pixel located to be distant by X pixels from the pixel at the position corresponding the neck, distant by Y pixels from a pixel at a position corresponding to a shoulder (left shoulder or right shoulder), and distant by Z pixels from a pixel at a position corresponding to the face as a pixel having transparency to be changed.

Moreover, although a transparency change ratio for changing transparency of pixels around the neck of the clothes has been herein described, a transparency change ratio for changing transparency of pixels around the sleeve or the skirt of the clothes can also be determined in the same manner. Specifically, in determining a transparency change ratio for changing transparency of pixels around the sleeve of the clothes, the transparency change ratio can be determined by replacing the above-described distance from the pixel at the position corresponding to the neck with a distance from a pixel at a position corresponding to a hand (right hand or left hand). Moreover, in determining a transparency change ratio for changing transparency of pixels around the skirt of the clothes, the transparency change ratio can be determined by replacing the above-described distance from the pixel at the position corresponding to the neck with a distance from a pixel at a position corresponding to the waist or the thigh.

Furthermore, it has been herein assumed that a transparency change ratio is determined using differences in brightness between a pixel having transparency to be changed and pixels located around the pixel having transparency to be changed. However, for example, a transparency change ratio may be determined using a difference between a pattern including a pixel having transparency to be changed and a pattern including a pixel located near the pixel having transparency to be changed.

As described above, the second clothing image creator 107, which will be described later, can generate second clothing images as shown in FIG. 7(A) to FIG. 7(C) by calculating a transparency change ratio as a first edit value. That is, as shown in FIG. 7(A), a second clothing image 31*a* in which a portion (boundary portion) reaching the back of the collar is more blurred and a tip portion is more rounded than in a first clothing image 30 can be generated. Moreover, as shown in FIG. 7(B), a second clothing image 31*b* in which a portion showing the reverse of the skirt is cut (that is, transparency has been set at 0) can be generated. Furthermore, as shown in FIG. 7(C), a second clothing image 31*c* in which a portion showing the reverse of the sleeve is cut can be generated.

Next, the case of calculating a scaling ratio as a first edit value will be described with reference to FIG. 8.

Figure 8:
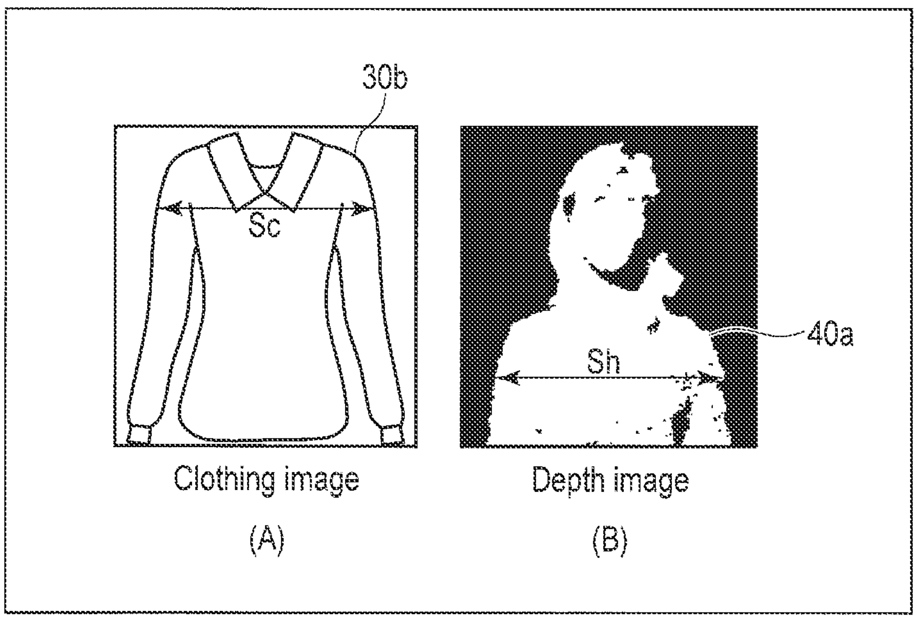
FIG. 8 is an illustration for explaining calculation of a scaling ratio in the embodiment.

FIG. 8 is an illustration for explaining calculation of a scaling ratio, FIG. 8(A) is an illustration for explaining a first clothing image 30*b*, and FIG. 8(B) is an illustration for explaining a first subject image 40*a*. It is herein assumed that the first subject image acquisition module 101 has acquired the first subject image 40*a* shown in FIG. 8(B) as a first subject image. Moreover, it is herein assumed that the first clothing image acquisition module 104 has acquired the first clothing image 30*b* shown in FIG. 8(A) as a first clothing image.

The first edit value calculator 106 calculates a scaling ratio of the first clothing image 30*b* so that a first subject in the first subject image 40*a* will be in the state of naturally wearing clothes of the first clothing image 30*b*.

Specifically, the first edit value calculator 106 first specifies (calculates) a Y-coordinate of a pixel at a position corresponding to the left shoulder and a Y-coordinate of a pixel at a position corresponding to the right shoulder of joint positions on the first subject image 40*a* from skeleton information of the first subject generated by the reference position information acquisition module 103 (or skeleton information included in the first subject image 40*a*).

Then, the first edit value calculator 106 conducts a search from an X-coordinate of the above-described pixel at the position corresponding to the left shoulder to a region corresponding to an outside of the first subject image 40*a* in a position (height) of the above specified Y-coordinate, and specifies an X-coordinate indicating a position of a borderline (outline) on the left shoulder side of the first subject image 40*a*. Similarly, the first edit value calculator 106 conducts a search from an X-coordinate of the above-described pixel at the position corresponding to the right shoulder to a region corresponding to the outside of the first subject image 40*a* in a position (height) of the above specified Y-coordinate, and specifies an X-coordinate indicating a position of a borderline on the right shoulder side of the first subject image 40*a*.

By determining a difference between the two X-coordinates specified in the above manner, the first edit value calculator 106 can determine a shoulder width (pixel) Sh on the first subject image 40*a* shown in FIG. 8(B).

Moreover, the first edit value calculator 106 can also determine a shoulder width (pixel) Sc on the first clothing image 30*b* shown in FIG. 8(A) by performing the process performed for the first subject image 40*a* also for the first clothing image 30*b*.

Next, the first edit value calculator 106 determines (calculates) a scaling ratio (scaling value) of the first clothing image 30*b* using the shoulder width Sc of the first clothing image 30*b* and the shoulder width Sh of the first subject image 40*a*. Specifically, the first edit value calculator 106 calculates a value (Sh/Sc) obtained by dividing the shoulder width Sh of the first subject image 40*a* by the shoulder width Sc of the first clothing image 30*b* as a scaling ratio. In addition, a scaling ratio may be calculated by another expression, using the actual size of the clothes, or a value such as the number of pixels corresponding to the width and the height of a clothing image region.

Then, the case of calculating a deformation ratio as a first edit value will be described with reference to FIG. 9.

Figure 9:
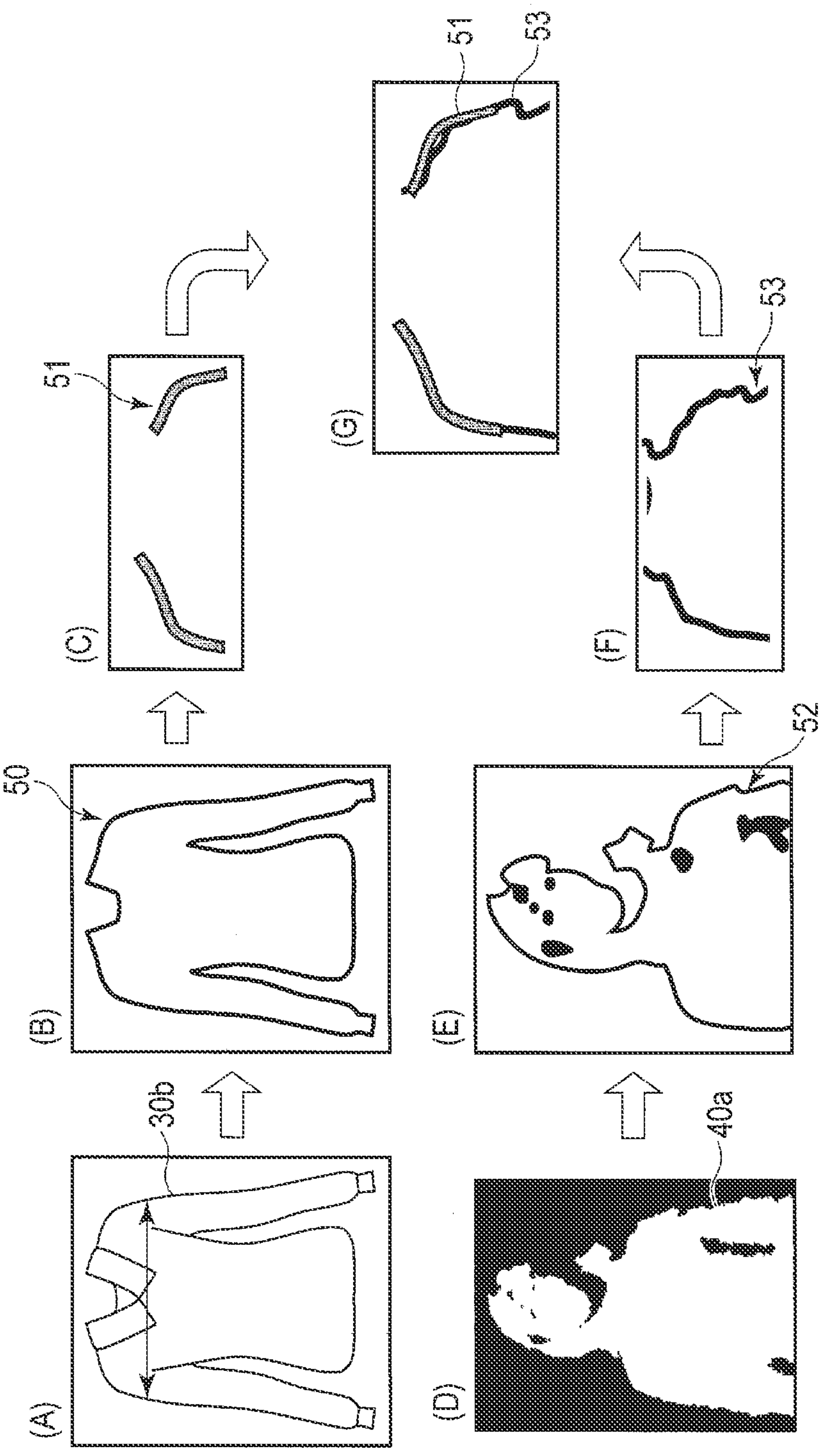
FIG. 9 is an illustration for explaining calculation of a deformation ratio in the embodiment.

FIG. 9 is an illustration for explaining calculation of a deformation ratio. It is herein assumed that the first subject image acquisition module 101 has acquired the first subject image 40*a* shown in FIG. 9(D) as a first subject image. Moreover, it is herein assumed that the first clothing image acquisition module 104 has acquired the first clothing image 30*b* shown in FIG. 9(A) as a first clothing image.

The first edit value calculator 106 calculates a deformation ratio of the first clothing image 30*b* so that the first subject in the first subject image 40*a* will be in the state of naturally wearing the clothes of the first clothing image 30*b*.

Specifically, the first edit value calculator 106 first extracts an outline 50 of the first clothing image 30*b* as shown in FIG. 9(B). Then, the first edit value calculator 106 extracts, for example, an outline 51 of a part corresponding to the shoulders of a human body of the extracted outline 50 of the first clothing image 30*b* as shown in FIG. 9(C).

Similarly, the first edit value calculator 106 extracts an outline 52 of the first subject image 40*a* as shown in FIG. 9(E).

In addition, although FIG. 9 illustrates the case where the first edit value calculator 106 uses a depth image of the first subject as a first subject image, the first edit value calculator 106 may use a color image of the first subject as a first subject image.

Next, the first edit value calculator 106 extracts an outline 53 of the part corresponding to the shoulders of the human body of the extracted outline 52 as shown in FIG. 9(F). Further, the first edit value calculator 106 performs template matching using the outline 51 of the part corresponding to the shoulders of the first clothing image 30*b* and the outline 53 of the part corresponding to the shoulders of the first subject image 40*a* as shown in FIG. 9(G). Then, the first edit value calculator 106 calculates a deformation ratio of the outline 51 for making the outline 51 conform to the shape of the outline 53. The first edit value calculator 106 can thereby calculate the calculated deformation ratio as a first edit value for editing the first clothing image 30*b*.

After calculating a first edit value in the above-described manner, the first edit value calculator 106 outputs the calculated first edit value to the second clothing image generator 107.

Returning to the description of FIG. 1, the second clothing image generator 107 generates a second clothing image in which at least one of the transparency, the size, the shape, and the position of a first clothing image is edited, using a first edit value calculated by the first edit value calculator 106. For example, the second clothing image generator 107 edits the transparency of the first clothing image by adjusting the transparency of the first clothing image using a first edit value related to a transparency change ratio, and generates a second clothing image. Moreover, the second clothing image generator 107 edits the size of the first clothing image by scaling up or scaling down the first clothing image using a first edit value related to a scaling ratio, and generates a second clothing image. Furthermore, the second clothing image generator 107 edits the shape of the first clothing image by deforming the first clothing image using a first edit value related to a deformation ratio, and generates a second clothing image. In addition, the deformation of the first clothing image includes a process of changing a length-to-width ratio (aspect ratio) of the first clothing image, etc.

In addition, it is preferable that the second clothing image generator 107 edit the first clothing image using a first edit value in a first range so that the clothes are naturally worn. The first range is information which defines a range (an upper limit value and a lower limit value) of a first edit value.

More specifically, the first range is a range in which the visual features of clothes of a first clothing image to be edited are not lost. That is, the first range defines an upper limit value and a lower limit value of a first edit value so that the visual features of the clothes of the first clothing image to be edited are not lost. For example, the design of clothes, the pattern of clothes, the shape of clothes, etc., which are the visual features of the clothes of the first clothing image may be lost by editing by the second clothing image generator 107. It is therefore preferable to define a range in which the visual features of the clothes of the first clothing image to be edited are not lost as a first range.

The second clothing image generator 107 generates a second clothing image obtained by editing a first clothing image using a first edit value in a first range, whereby the second clothing image can be effectively used as a clothing image to be combined.

In this case, it suffices that the first range is stored in advance in the storage 14, being associated with the kind of clothes. The first range and an association between the first range and the kind of clothes can be appropriately changed by the user's operation instruction of the input module 13. Moreover, it suffices that the first clothing image acquisition module 104 acquires a first clothing image and acquires the kind of clothes of the first clothing image from the input module 13. It suffices that the kind of clothes is input by the user's operation instruction of the input module 13. The second clothing image generator 107 can read a first range associated with the kind of clothes acquired by the first clothing image acquisition module 104 from the storage 14, and use it for editing the first clothing image.

In addition, the first range may be a range in which when a plurality of second clothing images are superimposed on each other, the second clothing image on the lower side is included in a region of the second clothing image on the upper side. For example, the plurality of second clothing images may be used to generate a composite image showing the state where a subject wears clothes in layers or in combination. In this case, if the second clothing image on the lower side is larger than a region of the second clothing image on the upper side, it is hard to provide a natural composite image. Therefore, the first range may also be a range in which when the plurality of second clothing images are superposed on each other, the second clothing image on the lower side is included in the region of the second clothing image on the upper side.

In this case, it suffices that the first range is stored in advance in the storage 14, being associated with the kind of clothes and the order of superimposing clothes. The order of superimposing clothes is information indicating in which layer of layers from a lower layer side which is the closest to a human body to an upper layer side which is the furthest from the human body, clothes of the associated kind of clothes are generally worn when they are worn on the human body, etc., in layers. In this case, the first range is a range of numerical values which are included in a region of the second clothing image on the upper side when the clothes of the associated kind are worn in the associated order of superimposition.

The kind of clothes, the order of superimposing clothes, and the first range can be appropriately changed by the user's operation instruction of the input module 13, etc. Moreover, it suffices that the first clothing image acquisition module 104 acquires a first clothing image, and acquires the kind of clothes and the order of superimposing clothes of the first clothing image from the input module 13. It suffices that the kind of clothes and the order of superimposing clothes are input by the user's operation instruction of the input module 13. The second clothing image generator 107 can thereby read a first range associated with the kind of clothes and the order of superimposing clothes acquired by the first clothing image acquisition module 104 from the storage 14, and use it for editing the first clothing image.

Figure 10:
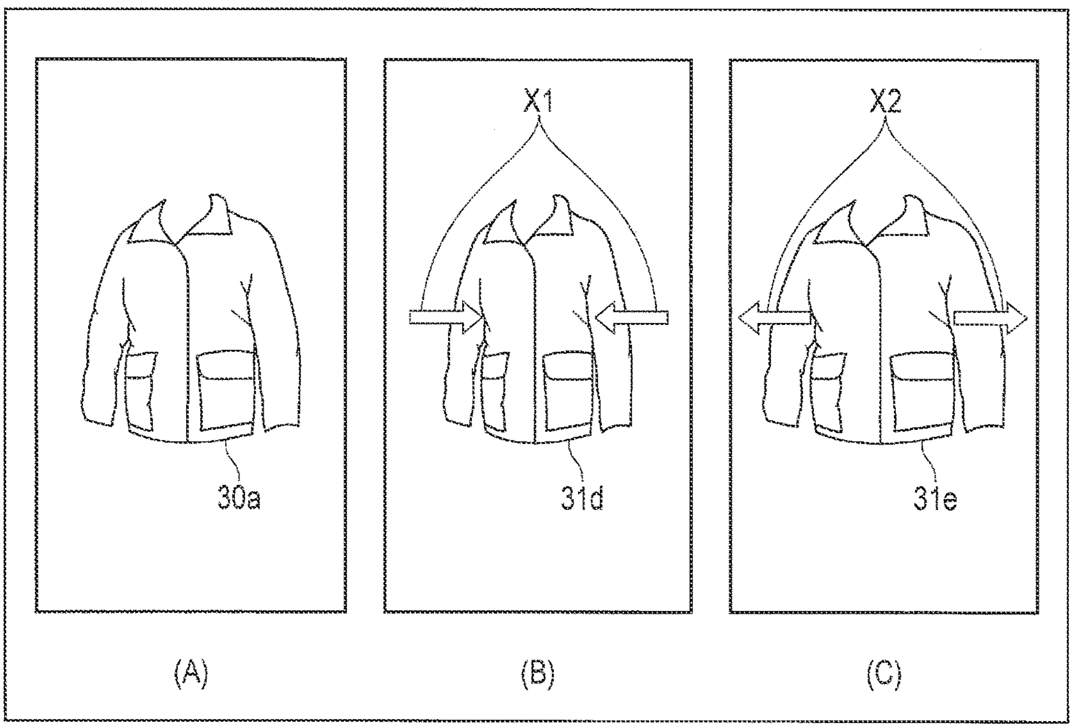
FIG. 10 illustrates an example of the second clothing image according to the embodiment.

FIG. 10 illustrates an example of the second clothing image 31. For example, it is assumed that the first clothing image 30 is the first clothing image 30*a* shown in FIG. 10(A). In this case, the second clothing image generator 107 generates a second clothing image 31*d* as shown in FIG. 10(B) by deforming the first clothing image 30*a* shown in FIG. 10(A) in the directions of arrows of X1 in FIG. 10. Moreover, the second clothing image generator 107 generates a second clothing image 31*e* shown in FIG. 10(C) by deforming the first clothing image 30*a* shown in FIG. 10(A) in the directions of arrows of X2 in FIG. 10.

In addition, in editing a position, it suffices that the second clothing image generator 107 changes the position of the first clothing image 30*a* in a pickup image in the pickup image. Moreover, in editing transparency, it suffices that the second clothing image generator 107 changes the transparency of a pixel having transparency to be changed included in the first clothing image 30*a* in accordance with a transparency change ratio calculated by the first edit value calculator 106.

The second clothing image generator 107 may edit the size and the shape of the entire first clothing image 30*a*. Moreover, the second clothing image generator 107 may divide the first clothing image 30*a* into regions (for example, rectangular regions) and edit the size and the shape of each of the regions. In this case, first edit values for the respective regions may be the same or different. For example, a region corresponding to a sleeve part of clothes may be deformed to have a larger aspect ratio than other regions. Moreover, the second clothing image creator 107 may carry out the above-described editing by a free form deformation (FFD) process.

Figure 11:
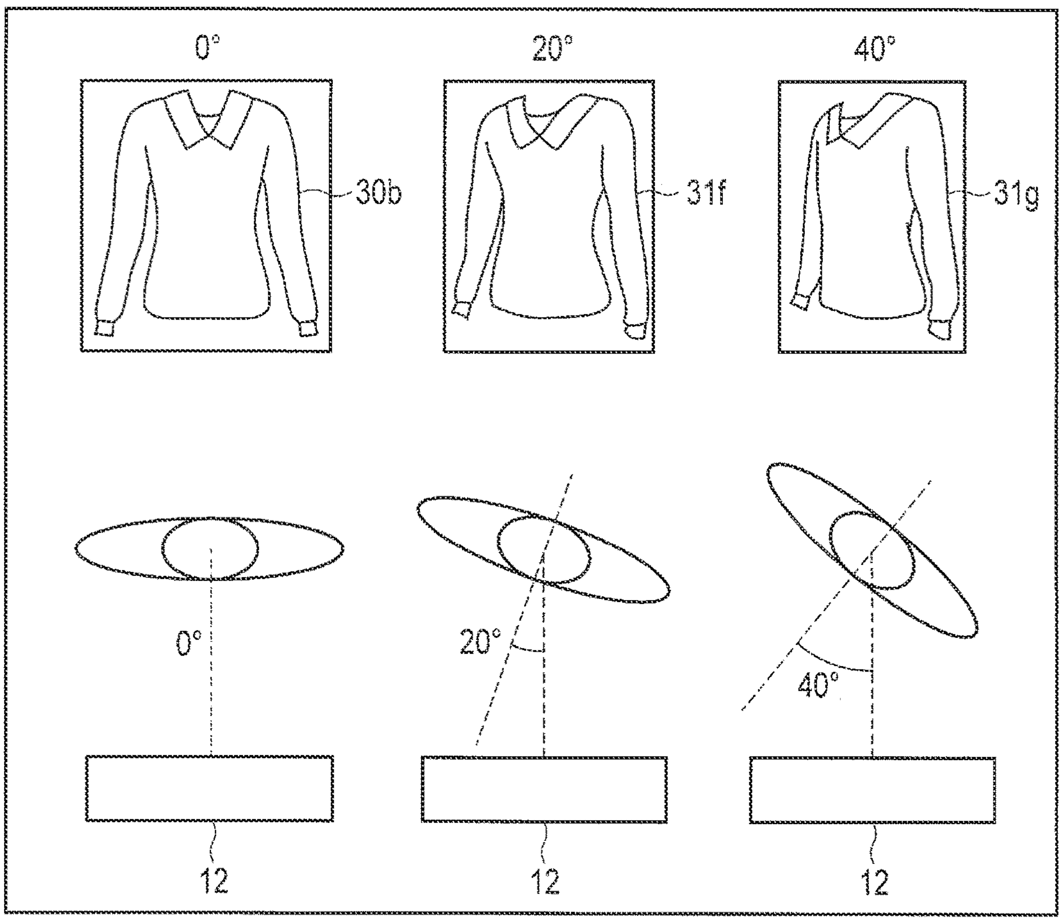
FIG. 11 is an illustration for explaining a rotation angle in the embodiment.

Moreover, the second clothing image generator 107 may generate a second clothing image, editing a rotation angle of a first clothing image as shown in FIG. 11. For example, a rotation angle of a pickup image picked up from the front with respect to the image pickup module 12 is 0°. The second clothing image generator 107 may generate a second clothing image 31*f* by changing the rotation angle, for example, rotating 20° the first clothing image 30*a* from the front to the right as shown in FIG. 11. Similarly, the second clothing image generator 107 may generate a second clothing image 31*g* by, for example, rotating 40° the first clothing image 30*a* from the front to the right as shown in FIG. 11.

In the above-described manner, the second clothing image generator 107 generates a second clothing image in which at least one of the transparency, the size, the shape, and the position of a first clothing image is edited.

A second clothing image generated by the second clothing image generator 107 is stored in the storage 14 by the storage controller 105. Specifically, a second clothing image generated by the second clothing image generator 107 is stored in the clothing DB 14*a*, being associated with a first subject image used to calculate a first edit value used to generate the second clothing image.

Moreover, whenever the second clothing image generator 107 generates a second clothing image using a first edit value from a first clothing image identified by a new clothing ID, the generated second clothing image is stored in the clothing DB 14*a* by the storage controller 105, being associated with a first subject image used to calculate the first edit value. Moreover, the second clothing image generator 107 may generate second clothing images of different first edit values from one first clothing image, carrying out editing using the different first edit values for clothes of the same clothing ID. In this case, the generated second clothing images are each stored in the clothing DB 14*a* by the storage controller 105, being associated with a first subject image used to calculate the above-described first edit values.

Therefore, as shown in FIG. 2, second clothing images are stored in the clothing DB 14*a*, being associated with one first subject image, one first body shape parameter, and one reference position information item.

Returning to the description of FIG. 1, the second subject image generator 108 edits a first subject image using a second edit value to generate a second subject image of a second body shape parameter different from a first body shape parameter of a first subject.

For example, the second subject image generator 108 generates a second subject image of a second body shape parameter different from a first body shape parameter by editing at least one of the transparency, the size, the shape, and the position of the first subject image. Specifically, the second subject image generator 108 edits at least one of the transparency, the size, the shape, and the position of the first subject image using a second edit value. For example, the second subject image generator 108 edits the size of the first subject image by scaling up or scaling down the first subject image. Moreover, the second subject image generator 108 edits the shape of the first subject image by deforming the first subject image. The deformation of the first subject image includes a process of changing a length-to-width ratio (aspect ratio) of the first subject image, etc.

The second subject image generator 108 first calculates a second edit value to generate a second subject image of a second subject of a second body shape parameter different from a first body shape parameter of a first subject. Then, the second subject image generator 108 edits at least one of the transparency, the size, the shape, and the position of the first subject image using the calculated second edit value, and generates the second subject image.

In addition, it is preferable that the second subject image generator 108 edit the first subject image using a second edit value in a predetermined second range. The second range is information which defines a range (an upper limit value and a lower limit value) of a second edit value.

More specifically, the second range is a range in which a human body can be assumed. That is, the second range is a range of a second edit value in which a body shape of a first subject in a first subject image to be edited can be assumed as a human body. Moreover, the second range is preferably a range in which the visual features of clothes are not lost when it is assumed that the first subject image to be edited wears the clothes. Therefore, the second range is preferably a range according to the above-described first range.

In this case, it suffices that the second range is stored in advance in the storage 14, being associated with the kind of clothes and the first range. The first range, the second range, and an association between the first range, the second range and the kind of clothes can be appropriately changed by the user's operation instruction of the input module 13, etc. Moreover, it suffices that the first clothing image acquisition module 104 acquires a first clothing image and acquires the kind of clothes of the first clothing image from the input module 13. The second subject image generator 108 can thereby read the second range associated with the kind of clothes acquired by the first clothing image acquisition module 104 and the first range used by the second clothing image generator 107 from the storage 14, edit the first subject image using a second edit value in the read second range, and generate a second subject image.

The third clothing image generator 109 calculates a second body shape parameter indicating a body shape of a second subject image and reference position information associated with the second subject image from a first body shape parameter and reference position information associated with a first subject image, using a second edit value and the first subject image used to generate the second subject image.

More specifically, the third clothing image generator 109 first reads a second edit value and a first subject image used to generate a second subject image (from a processing history, etc., temporally stored in a memory not shown in the figures, etc.). Then, the third clothing image generator 109 edits a first body shape parameter and reference position information associated with the read first subject image using the second edit value. The third clothing image generator 109 can thereby calculate a second body shape parameter indicating a body shape of the second subject image and reference position information associated with the second subject image.

When a second subject image is generated, the storage controller 105 stores the second subject image in the storage 14. More specifically, the storage controller 105 stores a generated second subject image in the clothing DB 14*a*, associating it with a subject ID of a first subject image which is an editing source of the second subject image, as shown in FIG. 2.

Moreover, when a second body shape parameter associated with a second subject image and reference position information associated with the second subject image are calculated, the storage controller 105 stores them in the storage 14. More specifically, the storage controller 105 stores a calculated second body shape parameter and calculated reference position information in the clothing DB 14*a*, associating them with a second subject image used to calculate the second body shape parameter and the reference position information, as shown in FIG. 2.

Therefore, as shown in FIG. 2, in the clothing DB 14*a*, one first subject image and one or more second subject images are stored, being associated with one subject ID as subject images. Moreover, a second body shape parameter and reference position information are stored, being associated with a second subject image one-to-one.

Returning to the description of FIG. 1, the third clothing image generator 109 edits a second clothing image using a second edit value used to generate a second subject image, and generates a third clothing image. That is, the third clothing image generator 109 generates a third clothing image by adjusting the transparency of a second clothing image, scaling the second clothing image, and deforming the second clothing image, using a transparency change ratio, a scaling ratio, a deformation ratio, etc., indicated by a second edit value.

In addition, the third clothing image generator 109 may edit the size and the shape of the entire second clothing image in the same way as the second clothing image generator 107. Moreover, the third clothing image generator 109 may divide the second clothing image into regions (for example, rectangular regions) and edit the size and the shape of each of the regions. In this case, second edit values of the respective regions may be the same or different. Moreover, the third clothing image generator 109 may carry out editing by the above-described FFD process.

When a third clothing image is generated by the third clothing image generator 109, the storage controller 105 stores the third clothing image in the storage 14. More specifically, the storage controller 105 first reads a second edit value used to generate the third clothing image. Then, the storage controller 105 stores the generated third clothing image in the clothing DB 14*a*, associating it with a second subject image generated by using the read second edit value.

Therefore, as shown in FIG. 2, in the clothing DB 14*a*, one first subject image and one or more second subject images are stored as subject images, being associated with one subject ID as described above. Moreover, in the clothing DB 14*a*, a plurality of third clothing images are stored, being associated with one second subject image, one second body shape parameter, and one reference position information item. Furthermore, as described above, a plurality of second clothing images are stored, being associated with one first subject image, one first body shape parameter, and one reference position information item. In addition, as described above, a second clothing image is a clothing image generated by editing a first clothing image, and a third clothing image is a clothing image generated by editing the second clothing image.

In addition, the storage controller 105 may store a second edit value used to generate a third clothing image in the storage 14 instead of the third clothing image. In this case, it suffices that the storage controller 105 stores the second edit value, associating it with a second subject image. In this case, a process of generating the third clothing image by the third clothing image generator 109 may not be performed.

Figure 12:
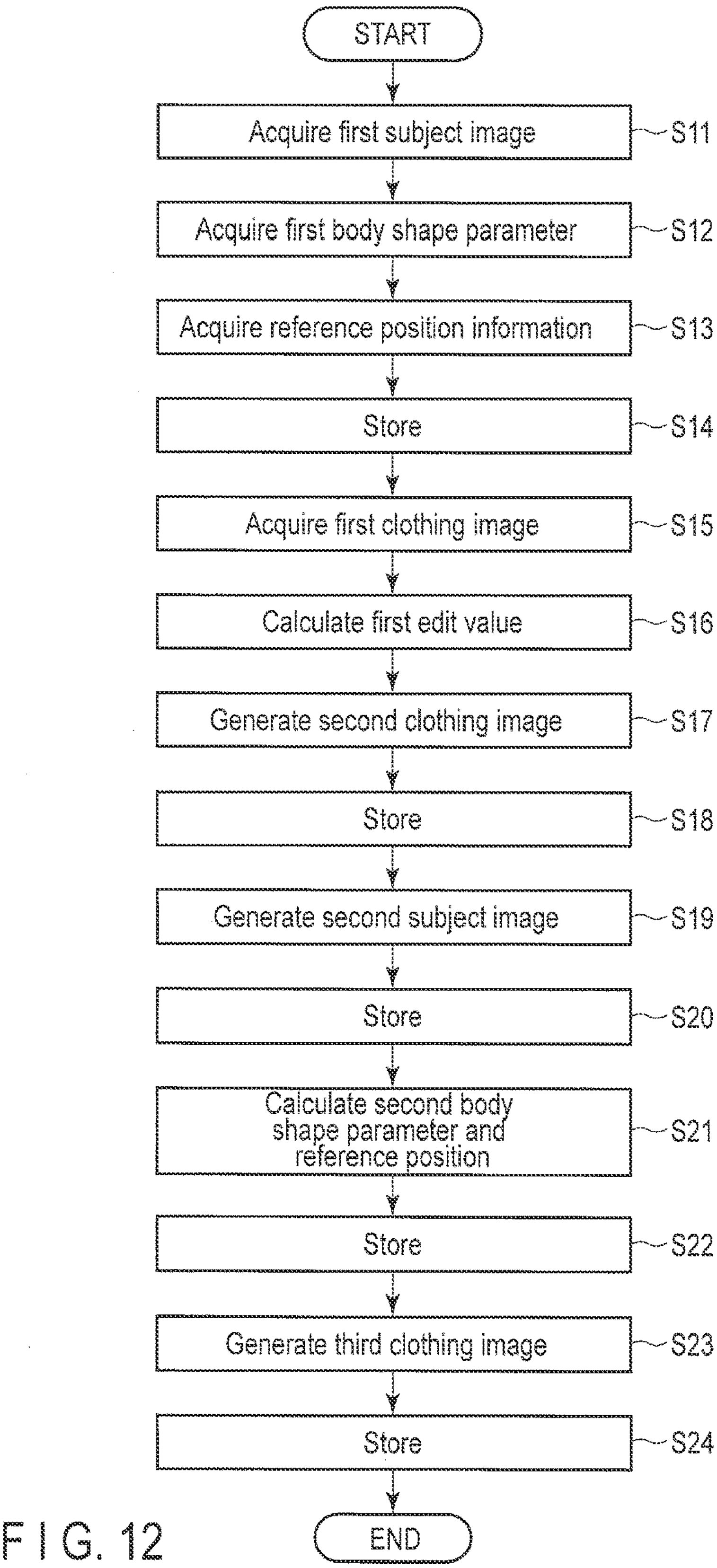
FIG. 12 is a flowchart showing an example of a procedure of processes performed by an image processing device according to the embodiment.

Next, an example of a procedure of image processing performed by the image processing device 11 according to the embodiment will be described with reference to the flowchart of FIG. 12.

First, the first subject image acquisition module 101 acquires a first subject image from the image pickup module 12 (step S11). Then, the body shape parameter acquisition module 102 estimates (acquires) a body shape parameter of a first subject in the first subject image based on a depth image included in the acquired first subject image (step S12). Next, the reference position information acquisition module 103 acquires reference position information in the acquired first subject image (step S13). Then, the storage controller 105 stores the acquired first subject image, the acquired first body shape parameter, and the acquired reference position information in the clothing DB 14*a*, associating them with a subject ID for identifying the first subject in the first subject image (step S14).

Next, the first clothing image acquisition module 104 extracts a clothing region from the acquired first subject image, and acquires a first clothing image (step S15). Then, the first edit value calculator 106 calculates a first edit value for editing the acquired first clothing image (step S16). Further, the second clothing image generator 107 edits the acquired first clothing image using the calculated first edit value, and generates a second clothing image (step S17). Then, the storage controller 105 stores the generated second clothing image in the storage 14, associating it with the acquired first subject image, the acquired first body shape parameter, and the acquired reference position information (step S18).

In addition, the image processing device 11 performs the processes of steps S11 to S18 repeatedly, whenever a first clothing image of clothes identified by another clothing ID is acquired.

Then, the second subject image generator 108 generates a second subject image from the first subject image stored in the storage 14 using a second edit value (step S19). Next, the storage controller 105 stores the second subject image in the clothing DB 14*a*, associating it with a subject ID of the first subject image used to generate the second subject image (step S20).

Then, the third clothing image generator 109 calculates a second body shape parameter indicating a body shape of the second subject image and reference position information associated with the second subject image from the first body shape parameter and the reference position information associated with the first subject image, using the second edit value and the first subject image used to generate the second subject image (step S21). Further, the storage controller 105 stores the calculated second body shape parameter and reference position information in the clothing DB 14*a*, associating them with the generated second subject image (step S22).

Next, the third clothing image generator 109 edits the generated second clothing image using the second edit value used to generate the second subject image, and generates a third clothing image (step S23). Then, the storage controller 105 stores the generated third clothing image in the clothing DB 14*a*, associating it with the second subject image (step S24), and the processes herein end.

In addition, as described above, the storage controller 105 may store the second edit value in the clothing DB 14*a*, associating it with the generated second subject image, instead of the third clothing image. In this case, the processes of steps S23 and S24 are not performed.

The image processing device 11 performs the above-described processes of step S11 to S24, whereby various kinds of data shown in FIG. 2 are stored in the clothing DB 14*a*. That is, in the clothing DB 14*a*, a first subject image, a first body shape parameter, reference position information, and one or more second clothing images are stored, being associated with each other. Moreover, in the clothing DB 14*a*, one first subject image and one or more second subject images are stored, being associated with one subject ID. Furthermore, in the clothing DB 14*a*, a second subject image, a second body shape parameter, reference position information, and one or more third clothing images are stored, being associated with each other.

According to the above-described embodiment, the image processing device 11 does not store a first clothing image of clothes to be combined in the storage 14 as it is, but stores a second clothing image in which the transparency, the size, the shape, the position, etc., of the first clothing image are edited in the storage 14. Thereby, a natural fitting state can be presented to the user, when a clothing image is combined with a subject image, that is, at the time of a virtual fitting.

Figure 13:
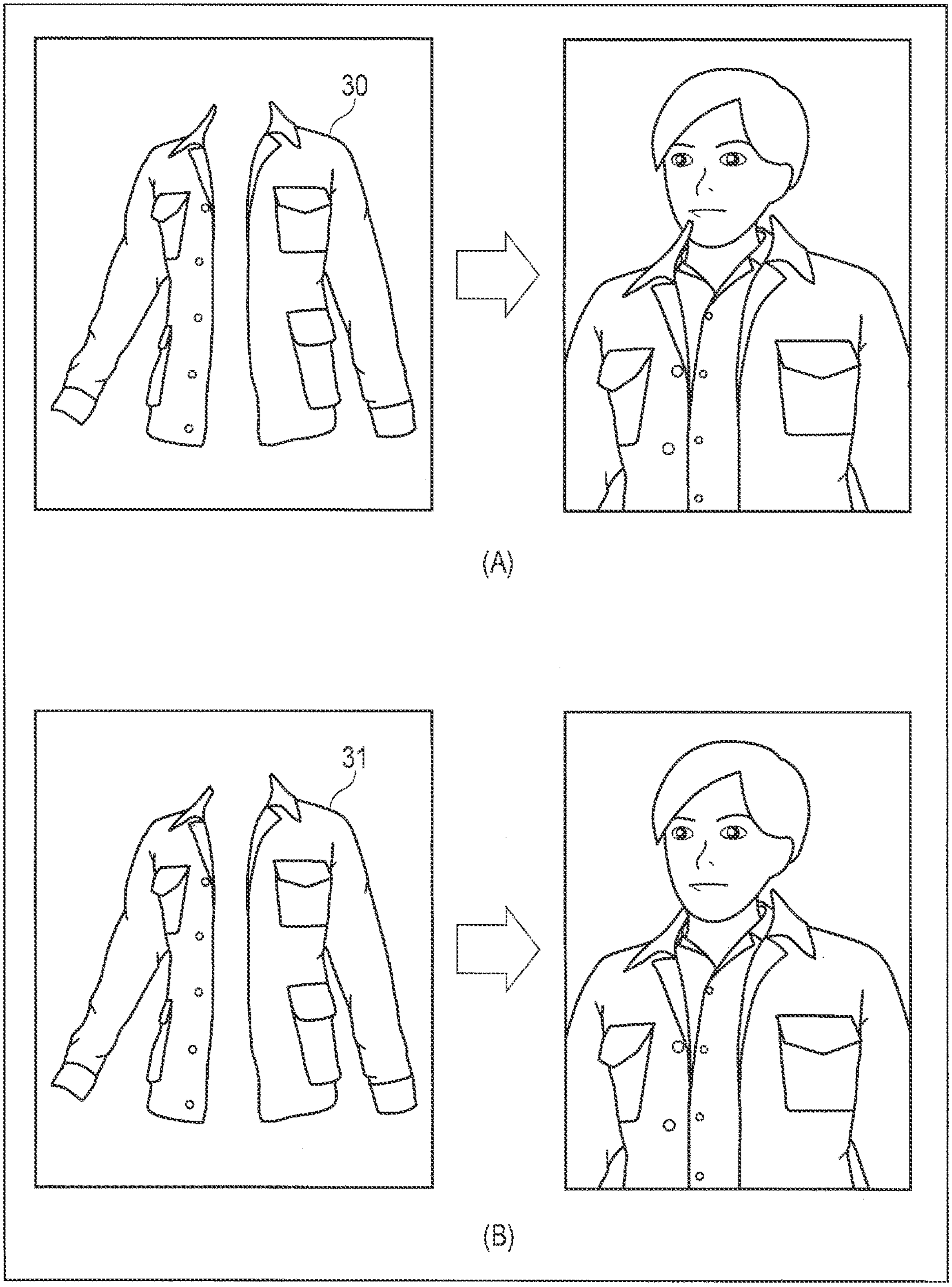
FIG. 13 is an illustration for explaining a difference between a case where the first clothing image is combined with a subject image and a case where the second clothing image is combined with the subject image in the embodiment.

FIG. 13 is an illustration for explaining a difference between the case where a first clothing image is combined with a subject image and the case where a second clothing image is combined with the subject image. FIG. 13(A) illustrates the case where the first clothing image 30 is combined with the subject image. In this case, a collar part of clothes of the first clothing image 30 sticks in the face of the subject image, and an unnatural fitting state is presented to the user. On the other hand, FIG. 13(B) illustrates the case where the second clothing image is combined with the subject image. The second clothing image 31 shown in FIG. 13(B) is an image in which the transparency of a pixel at the collar part of clothes of the first clothing image shown in FIG. 13(A) is changed. In this case, the collar part of clothes of the second clothing image 31 does not stick in the face of the subject image, and a natural fitting state can be presented to the user. In this manner, according to the image processing device 11 of the embodiment, a natural fitting state can be presented to the user at the time of a virtual fitting.

Moreover, according to the embodiment, since the image processing device 11 generates a second clothing image using a first edit value within a first range in which the visual features of a first clothing image are not lost, a more natural fitting state than in the case where the first clothing image is simply edited can be presented to the user.

Furthermore, according to the embodiment, since the image processing device 11 stores a third clothing image associated with a second body shape parameter different from a first body shape parameter associated with a second clothing image in the storage 14, a natural fitting state can be equally presented to users in various body shapes.

Moreover, according to the embodiment, since the image processing device 11 can also store a second edit value used to generate a third clothing image in the storage 14 instead of storing the third clothing image in the storage 14, a reduction in data capacity can be attempted in accordance with the data capacity of the storage 14.

A modification of the embodiment will be described hereinafter.

FIG. 14 illustrates another structure example of the image processing system according to the embodiment. In an image processing system 10*a* shown in FIG. 14, for example, a storage device 16 and a processing device 17 are connected through a communication line 18. The storage device 16 is a device including the above-described storage 14 shown in FIG. 1, and includes, for example, a personal computer. The processing device 17 is a device including the above-described image processing device 11, the above-described image pickup module 12, the above-described input module 13, and the above-described display 15, which are shown in FIG. 1. In addition, the same portions as those described above with reference to FIG. 1 are given the same reference numbers, and detailed explanations thereof are omitted. The communication line 18 is a communication line of, for example, the Internet, and includes a wire communication line and a wireless communication line.

As shown in FIG. 14, the storage 14 is provided in the storage device 16 connected to the processing device 17 through the communication line, whereby a plurality of processing devices 17 can access the same storage 14. Data stored in the storage 14 can be thereby managed in a unitary manner.

Next, a hardware structure of the image processing device 10 according to the embodiment will be described with reference to FIG. 15. FIG. 15 is a block diagram showing an example of the hardware structure of the image processing device 10 according to the embodiment.

As shown in FIG. 15, in the image processing device 10, a central processing unit (CPU) 201, a read only memory (ROM) 202, a random access memory (RAM) 203, a hard disk drive (HDD) 204, a display 205, a communication interface module 206, an image pickup module 207, an input module 208, etc., are connected to each other through a bus 209. That is, the image processing device 10 has a hardware structure in which a normal computer is used.

The CPU 201 is an arithmetic unit which controls the entire processing of the image processing device 10. The ROM 202 stores a program which implements various processes by the CPU 201, etc. The RAM 203 stores data necessary for various processes by the CPU 201. The HDD 204 stores the above-described data stored in the storage 14. The display 205 corresponds to the above-described display 15. The communication interface module 206 is an interface for connecting to an external device or an external terminal through a communication line, etc., and transmitting and receiving data to and from the connected external device or the connected external terminal. The image pickup module 207 corresponds to the above-described image pickup module 12. The input module 208 corresponds to the above-described input module 13.

In addition, the above-described program for performing various processes performed in the image processing device 10 according to the embodiment is incorporated in the ROM 202, etc., in advance. Moreover, the program can be stored in advance in a computer-readable storage medium to be distributed. Furthermore, the program may be, for example, downloaded to the image processing device 10 through a network.

In addition, the above-described various kinds of information stored in the HDD 204, that is, various kinds of information stored in the storage 14, may be stored in an external device (for example, a server device), etc. In this case, it suffices that the external device and the CPU 201 are connected through a network, etc.

In addition, since the processes of the embodiment can be implemented by a computer program, the same advantages as those of the embodiment can be easily achieved simply by installing the computer program in a computer through a computer-readable storage medium storing the computer program, and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:

memory; and a computer configured to execute instructions stored in the memory to control the image processing device to at least:

acquire a subject bitmap image including a subject;

acquire a first bitmap image including clothing for virtually fitting on the subject;

acquire skeleton information indicating a frame of the subject;

specify a pixel at a first place of the first bitmap image relating to a predetermined reference region based on the skeleton information;

determine whether a brightness difference between the pixel at the first place and a pixel of the first bitmap image located around the pixel at the first place exceeds a threshold value; and based on determining that the brightness difference exceeds the threshold value, generate a second bitmap image including the clothing, different from the first bitmap image, by applying a first transparency to the pixel at the first place of the first bitmap image and applying a second transparency different from the first transparency to a pixel at a second place of the first bitmap image different from the first place; and control display of a composite image in which the second bitmap image is superimposed on the subject bitmap image to virtually fit the clothing on the subject.

2. The image processing device of claim 1, wherein the computer is configured to execute instructions stored in the memory to further control the image processing device to:

specify the pixel at the first place so as to be distant by a predetermined number of pixels from a pixel at a position corresponding to the reference region; and apply the first transparency to the pixel at the first place so that the pixel at the first place has a transparency less than a current value of the transparency of the pixel at the first place.

3. The image processing device of claim 1, wherein the computer is configured to execute instructions stored in the memory to further control the image processing device to specify at least one position of a neck, a shoulder, and a face as a reference region for applying the first transparency to a pixel located around a collar of the clothing included in the first bitmap image, specify a position of a hand as a reference region for applying the first transparency to a pixel located around a sleeve of the clothing, and specify at least one position of a waist and a thigh as a reference region for applying the first transparency to a pixel located around a skirt of the clothing.

4. The image processing device of claim 1, wherein the first transparency is 0 and the second transparency is 1.

5. The image processing device of claim 4, wherein the pixel at the first place is cut out from the second bitmap image when the first transparency is 0.

6. The image processing device of claim 4, wherein the pixel at the first place of the first bitmap image and a pixel of the second bitmap image at a place corresponding to the first place of the first bitmap image correspond to each other.

7. A computer-implemented method comprising:

acquiring a subject bitmap image including a subject;

acquiring a first bitmap image including clothing for virtually fitting on the subject;

acquiring skeleton information indicating a frame of the subject;

specifying a pixel at a first place of the first bitmap image relating to a predetermined reference region based on the skeleton information;

determining whether a brightness difference between the pixel at the first place and a pixel of the first image located around the pixel at the first place exceeds a threshold value;

based on determining that the brightness difference exceeds the threshold value, generating a second bitmap image including the clothing, different from the first bitmap image, by applying a first transparency to the pixel at the first place of the first bitmap image and applying a second transparency different from the first transparency to a pixel at a second place of the first bitmap image different from the first place; and displaying a composite image in which the second bitmap image is superimposed on the subject bitmap image to virtually fit the clothing on the subject.

8. The method of claim 7, further comprising:

specifying the pixel at the first place so as to be distant by a predetermined number of pixels from a pixel at a position corresponding to the reference region; and applying the first transparency to the pixel at the first place so that the pixel at the first place has a transparency less than a current value of the transparency of the pixel at the first place.

9. The method of claim 7, further comprising:

specifying at least one position of a neck, a shoulder, and a face as a reference region for applying the first transparency to a pixel located around a collar of the clothing included in the first bitmap image;

specifying a position of a hand as a reference region for applying the first transparency to a pixel located around a sleeve of the clothing; and specifying at least one position of a waist and a thigh as a reference region for applying the first transparency to a pixel located around a skirt of the clothing.

10. The method of claim 7, wherein the first transparency is 0 and the second transparency is 1.

11. The method of claim 10, wherein the pixel at the first place is cut out from the second bitmap image when the first transparency is 0.

12. The method of claim 10, wherein the pixel at the first place of the first bitmap image and a pixel of the second bitmap image at a place corresponding to the first place of the first bitmap image correspond to each other.

13. An image processing device comprising:

memory; and a computer configured to execute instructions stored in the memory to control the image processing device to at least:

acquire a subject bitmap image including a subject;

acquire a first bitmap image, the first bitmap image including clothing for virtually fitting on the subject having a first pattern and a second pattern different from the first pattern;

specify a pixel at a first place of the first bitmap image located on a first pattern side at a boundary portion where the first pattern changes to the second pattern;

generate a second bitmap image including the clothing, different from the first bitmap image, by applying a first transparency to the pixel at the first place and applying a second transparency different from the first transparency to a pixel at a second place of the first bitmap image on a second pattern side at the boundary; and display a composite image in which the second bitmap image is superimposed on the subject bitmap image to virtually fit the clothing on the subject.

14. The image processing device of claim 13, wherein the first transparency is 0 and the second transparency is 1.

15. The image processing device of claim 14, wherein the pixel at the first place is cut out from the second bitmap image when the first transparency is 0.

16. The image processing device of claim 14, wherein the pixel at the first place of the first bitmap image and a pixel of the second bitmap image at a place corresponding to the first place of the first bitmap image correspond to each other.

17. A computer-implemented method comprising:

acquiring a subject bitmap image including a subject;

acquiring a first bitmap image, the first bitmap image including clothing for virtually fitting on the subject having a first pattern and a second pattern different from the first pattern;

specify a pixel at a first place of the first bitmap image located on a first pattern side at a boundary portion where the first pattern changes to the second pattern;

generating a second bitmap image including the clothing, different from the first bitmap image, by applying a first transparency to the pixel at the first place and applying a second transparency different from the first transparency to a pixel at a second place of the first bitmap image on a second pattern side at the boundary; and displaying a composite image in which the second bitmap image is superimposed on the subject bitmap image to virtually fit the clothing on the subject.

18. The method of claim 17, wherein the first transparency is 0 and the second transparency is 1.

19. The method of claim 18, wherein the pixel at the first place is cut out from the second bitmap image when the first transparency is 0.

20. The method of claim 18, wherein the pixel at the first place of the first bitmap image and a pixel of the second bitmap image at a place corresponding to the first place of the first bitmap image correspond to each other.

* * * * *